US011132059B2

(12) United States Patent
Bonanno et al.

(10) Patent No.: US 11,132,059 B2
(45) Date of Patent: Sep. 28, 2021

(54) INPUT DEVICE WITH HAPTIC INTERFACE

(71) Applicant: Logitech Europe S.A., Lausanne (CH)

(72) Inventors: Daniel Bonanno, Geneva (CH); Florent Berney, Echallens (CH); Nicolas Ramond, Lurgrin (FR); Olivier Theytaz, Savigny (CH); Jan Stoeckli, Jongny (CH); Jean-Claude Dunant, Fey (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/131,958

(22) Filed: Sep. 14, 2018

(65) Prior Publication Data

US 2019/0079584 A1   Mar. 14, 2019

Related U.S. Application Data

(60) Provisional application No. 62/558,800, filed on Sep. 14, 2017.

(51) Int. Cl.
*G06F 3/01* (2006.01)
*G06F 3/0362* (2013.01)
*G06F 3/0354* (2013.01)

(52) U.S. Cl.
CPC ............ *G06F 3/016* (2013.01); *G06F 3/0362* (2013.01); *G06F 3/03543* (2013.01)

(58) Field of Classification Search
CPC combination set(s) only.
See application file for complete search history.

(56) References Cited

U.S. PATENT DOCUMENTS

| 2009/0267902 | A1 | 10/2009 | Nambu et al. |
| 2010/0265191 | A1* | 10/2010 | Mui .................... G06F 3/04886 345/173 |
| 2012/0162114 | A1 | 6/2012 | Inoue et al. |
| 2013/0169424 | A1* | 7/2013 | Kujawski ................ G08B 6/00 340/407.2 |
| 2016/0023245 | A1* | 1/2016 | Zadesky ................ G06F 1/163 310/334 |
| 2019/0041986 | A1* | 2/2019 | Rihn ..................... A63F 13/285 |

* cited by examiner

*Primary Examiner* — Robin J Mishler
(74) *Attorney, Agent, or Firm* — Kilpatrick Townsend & Stockton LLP

(57) ABSTRACT

Aspects of the invention include an input device comprising a housing having a region, a haptic element coupled to the housing, the haptic element configured to generate a haptic feedback and couple the haptic feedback to the region of the housing, and a force-sensitive element coupled to the housing, the force-sensitive element configured to detect a threshold input force applied-to and removed-from the region of the housing, the force-sensitive element being different from the haptic element. The haptic element may generate a first haptic feedback in response to the force-sensitive element detecting the threshold force being applied to the region of the housing, and the haptic element may generate a second haptic feedback in response to the force-sensitive element detecting the threshold force being removed from to the region of the housing, the first haptic feedback being different than the second haptic feedback.

20 Claims, 12 Drawing Sheets

INPUT DEVICE WITH HAPTIC INTERFACE

CROSS-REFERENCES TO RELATED APPLICATIONS

This application is a non-provisional application of, and claims priority to, and the benefit of, U.S. Provisional Application No. 62/558,800, filed on Sep. 14, 2017, and titled "INPUT DEVICE WITH HAPTIC INTERFACE," the disclosure of which is herein incorporated by reference in its entirety for all purposes.

BRIEF SUMMARY

In certain embodiments, an input device (e.g., computer mouse, remote control, presenter device, game controller, etc.) can include a housing, an input structure disposed in the housing, a haptic element coupled to the input structure, the haptic element configured to generate haptic feedback and couple the haptic feedback to the input structure, and a vibration dampening material disposed around the input structure, the vibration dampening material configured to attenuate vibrations caused by the haptic element that pass from the input structure to a surrounding portion of the housing. The input structure can be tuned to a resonant frequency, and the haptic feedback from the haptic element may vibrate at the resonant frequency. In some cases, the input structure can be contoured to have a resonant frequency at a center portion of the input structure, and contoured to have one or more nodes at an outer edge of the input structure, such that vibrations at the resonant frequency on the input structure are of a lower amplitude at the outer edge than at the center portion. The input device can further include a processor disposed in the housing and a sensor element controlled by the processor, where the processor can apply an active cancellation that cancels signal interference coupled to the sensor element caused by vibrations within a threshold range of the resonant frequency.

In some embodiments, a method can include receiving an input force on a haptic element coupled to an input device, determining a force characteristic of the input force, generating a first type of haptic feedback in response to determining that the force characteristic is of a first type, and generating a second type of haptic feedback in response to determining that the force characteristic is of a second type. The first type of haptic feedback may correspond to a stationary pressing force substantially normal to a surface of the haptic element, and the second type of haptic feedback corresponds to a force sliding along the surface of the haptic element. In some cases, the first type of haptic feedback can simulate a button press action, and the second type of haptic feedback can simulate a wheel rotation action. The wheel rotation action may include simulated wheel rotation characteristics including at least two of a simulated rotational friction, a simulated ratcheted rotation, or a simulated ratchetless rotation.

In further embodiments, an input device may comprise a housing, a processor disposed in the housing, an interface element disposed on the housing, and a haptic element coupled to the interface element and controlled by the processor, the haptic element configured to detect an input force applied to a surface of the haptic element and generate a haptic feedback that propagates through the interface element. In some embodiments, the processor may cause the haptic element to generate a first type of haptic feedback in response to detecting an input force having a first force characteristic, and cause the haptic element to generate a second type of haptic feedback in response to detecting the input force having a second force characteristic. In some aspects, the first type of force characteristic may correspond to a stationary pressing force substantially normal to a surface of the haptic element, and the second type of force characteristic may correspond to a force sliding along the surface of the haptic element. The first type of haptic feedback can simulate a button press action, and the second type of haptic feedback can simulates a wheel rotation action. The wheel rotation action can include simulated wheel rotation characteristics including at least two of a simulated rotational friction, a simulated ratcheted rotation, or a simulated ratchetless rotation.

In certain embodiments, a computer mouse includes a housing configured to be interfaced with by a user, the housing including a left mouse button coupled to a first haptic element, a right mouse button coupled to a second haptic element, and a palm support region coupled to a third haptic element. The one or more processors can be configured to receive and process control signals generated by and received from the left mouse button and right mouse button and control the operation of the first, second, and third haptic elements. The computer mouse may further include a vibration absorption material configured around a perimeter of at least one of the left mouse button, the right mouse button, or the palm support region, where the vibration absorption material is configured to absorb and prevent vibrations generated by each haptic element to traverse beyond a corresponding perimeter it is configured within.

In some embodiments, the housing can further include a thumb support region coupled to a fourth haptic element and/or a pinky support region coupled to a fifth haptic element, where the one or more processors can be further configured to control the operation of the fourth and fifth haptic elements, and the vibration absorption material can be further configured around a perimeter of the thumb support region and the pinky support region. The first, second, and/or third haptic elements can be piezo-electric transducers or voice coils, each being controlled by the one or more processors. In some cases, at least one of the left mouse button, right mouse button, or palm support region of the housing can be tuned to resonate at a resonant frequency, where the haptic elements can be configured to vibrate at the resonant frequency. One or more nodes can be configured to exist at one or more portions of the housing based on the resonant frequency and a placement of the haptic elements, where the one or more nodes can be configured to cause a substantial (e.g., greater than 70% reduction) attenuation of the vibrations caused by the haptic elements at the one or more portions of the housing.

In certain embodiments, an input device can include a housing, one or more processors disposed in the housing, a button coupled to the housing, a switch coupled to the button and configurable in: a first mode configured to prevent the button from being mechanically depressible and a second mode configured to allow the button to be mechanically depressible, a haptic element coupled to the button, the haptic element controlled by the one or more processors and configured to generate a haptic feedback, and a force sensor coupled to the button, the force sensor configured to detect when the button receives a pressing force greater than or equal to a predetermined threshold force. The force sensor can be configured to generate a control signal in response to detecting the predetermined threshold force being applied to the button, and detect the pressing force when the switch is both in the first mode or in the second mode. The haptic element can be a piezo-electric transducer, acoustic transducers (e.g., a voice coil, ultrasonic transducers or ultra-haptics, air vortex rings), eccentric rotating mass actuators, or the like.

BRIEF DESCRIPTION OF THE DRAWINGS

The detailed description is set forth with reference to the accompanying figures.

DETAILED DESCRIPTION

Embodiments of this invention are generally directed to input devices. More specifically, systems and devices relate to controlling vibro-tactile haptic sensations from a vibro-tactile feedback device, which may be referred to as a "haptic device" or "haptic element."

In the following description, for the purpose of explanation, numerous examples and details are set forth in order to provide an understanding of embodiments of the present invention. It will be evident, however, to one skilled in the art that certain embodiments can be practiced without some of these details, or with modifications or equivalents thereof.

Aspects of the invention include the implementation of haptic devices in input devices to receive user inputs and provide haptic outputs. For example, a user input may include a force received from a user's finger applied to a piezo-based device that converts the input force to a voltage. The induced voltage can be used to control various functions on an input device including generating various control signals (e.g., button press, scrolling, scroll function, etc.), as further discussed below. The haptic devices can further be used to generate haptic output signals such as vibro-tactile haptic sensations that can simulate certain physical phenomena including a button depression and wheel rotation, among other performance parameters typically associated with mechanical input elements. That is, a haptic output can convincingly recreate a sensation of physically depressing a key, rotating a wheel, flipping a switch, or other physical input, using haptic vibrations.

In some embodiments that follow, novel approaches to addressing conventional challenges with implementing haptic elements in input devices are described. Some challenges include implementing a press-and-hold function using a haptic device (e.g., piezo device) as an input element, reducing the often increased power requirements of input devices employing haptic elements, and controlling the propagation of haptic feedback throughout an input device. Embodiments of the invention address these problems and more in the examples that follow.

Figure 1:
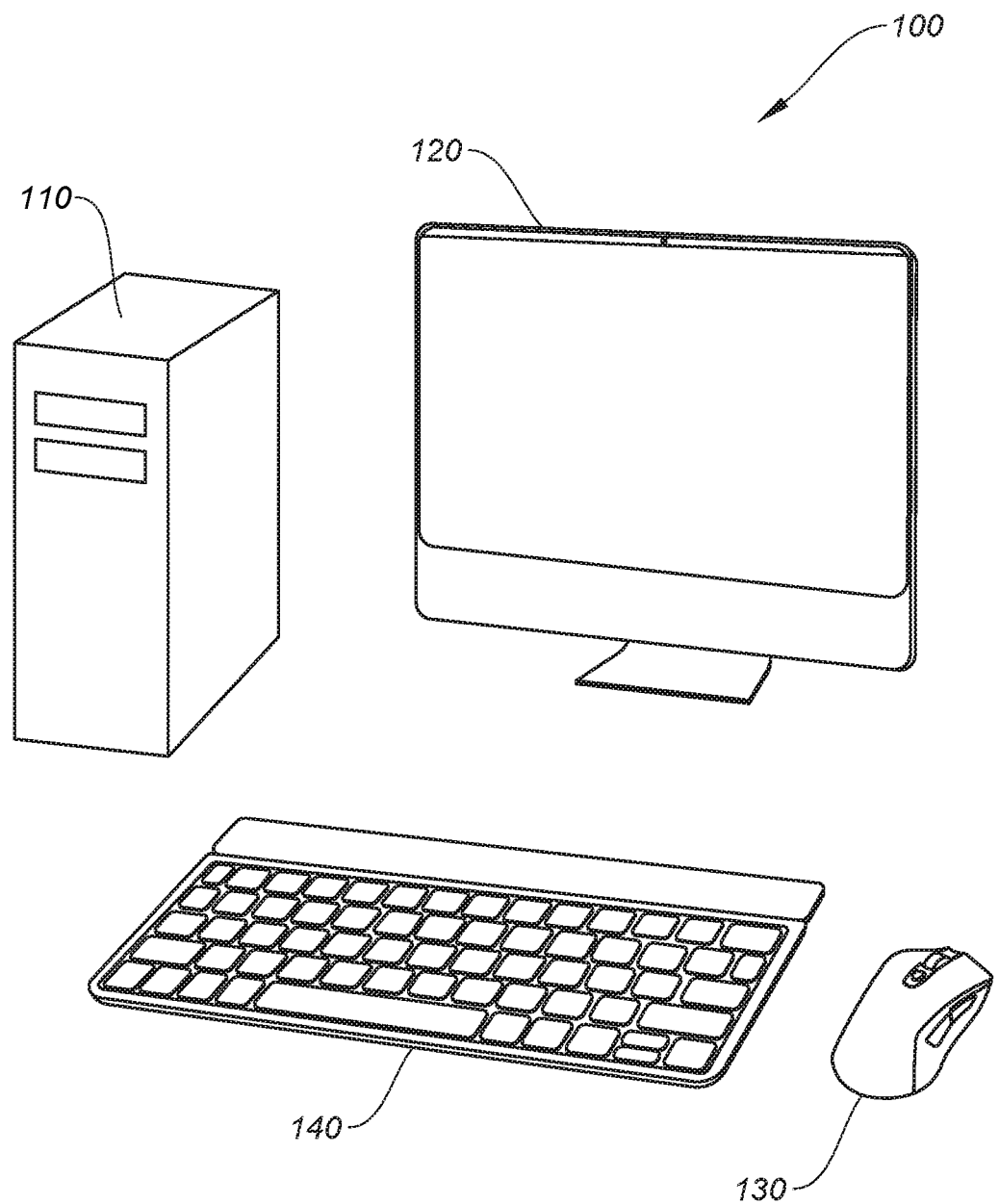
FIG. 1 shows a simplified diagram of a computer system, according to certain embodiments.

FIG. 1 shows a simplified diagram of a computer system 100, according to certain embodiments. Computer system 100 can include computer 110, monitor 120, input device 130, and keyboard 140. In some embodiments, input device 130 can be a computer mouse, a remote control device, a game controller (e.g., game pad, joystick, flight stick, etc.) or elements thereof (e.g., hat switch), a smart phone, or other suitable device that can be used to convert analog inputs into digital signals for computer processing. For computer system 100, input device 130 can be configured to control various aspects of computer 110 and monitor 120.

Computer 110 can be any suitable computing device including, but not limited to, a desktop computer, a laptop computer, a tablet or "phablet" computer, a smart phone, a PDA, a wearable devices (e.g., smart watches, smart glasses), virtual reality/augmented reality (AR/VR) system, or the like. In some embodiments, input device 130 can be configured to provide control signals for movement tracking (e.g., two-dimensional (2D) movement on a planar surface, three-dimensional (3D) "in-air" movements, etc.), touch and/or gesture detection, lift detection, orientation detection (e.g., in 3 degrees-of-freedom (DOF) system, 6 DOF systems, etc.), power management capabilities, input detection (e.g., buttons, scroll wheels, etc.), output functions (e.g., LED control, haptic feedback, etc.), or any of a myriad of additional features that would be understood by one of ordinary skill in the art. Computer 110 may include a machine readable medium (not shown) that is configured to store computer code, such as mouse driver software, where the computer code is executable by a processor (see, e.g., processor 210 of FIG. 2) of computer 110 to control aspects of computer 110 via input device 130, keyboard 140, or the like. The various embodiments described herein generally refer to input device 130 as a computer mouse or similar input device, however it should be understood that input device 130 can be any suitable input/output (I/O) device (e.g., user interface device, control device, input unit, or the like) that may be adapted to utilize the novel embodiments described and/or contemplated herein. More specifically, the embodiments that follow tend to focus on incorporation of haptic devices on a computer mouse, however it should be understood that the concepts described, taught, and suggested herein can be applied to other types of input devices including the non-exhaustive list of input devices above, a keyboard, a remote control device, an internet-of-things (IOT) controller, an AR/VR controller, a presenter device, etc., as would be understood by one of ordinary skill in the art.

Exemplary System for Operating Dual-Mode Input Device

Figure 2:
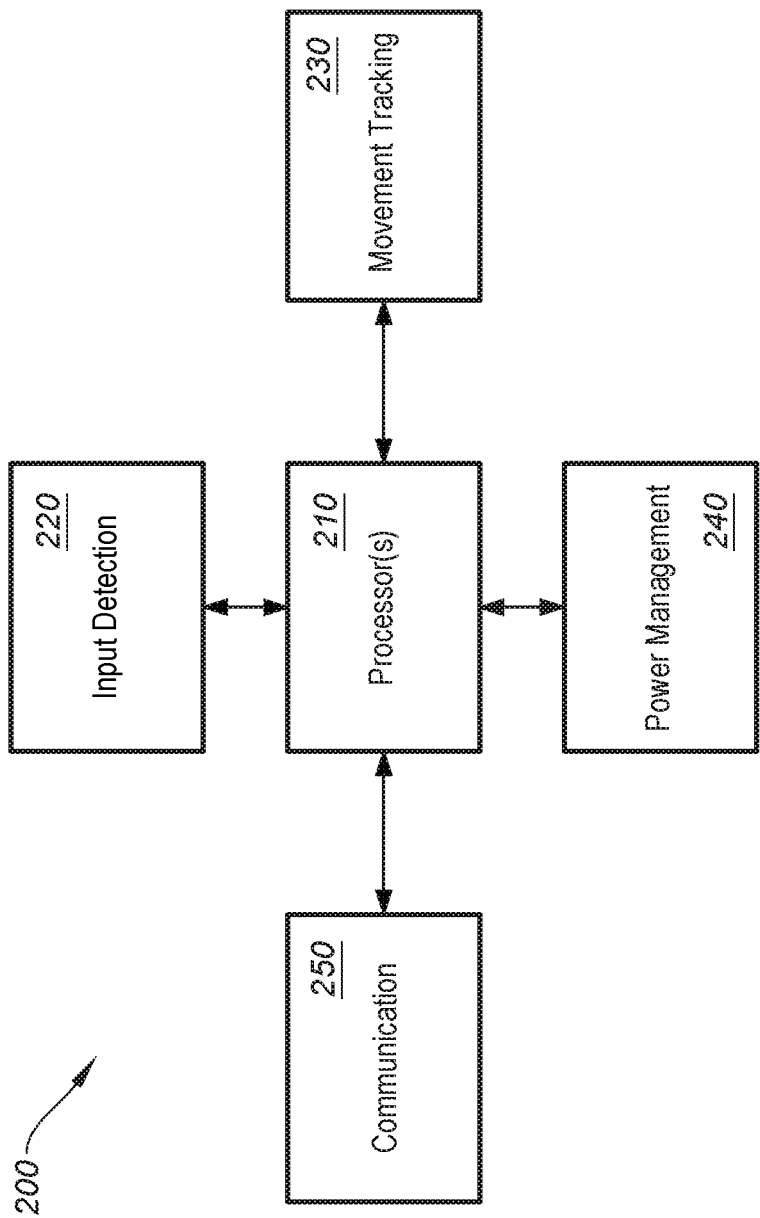
FIG. 2 shows a simplified block diagram of a system to operate input device, according to certain embodiments.

FIG. 2 shows a simplified block diagram of a system 200 to operate input device 130, according to certain embodiments. System 200 may include processor(s) 210, input detection block 220, movement tracking block 230, power management block 240, and communication block 250. Each of system blocks 220-250 can be in electrical communication with processor 210. System 200 may further include additional systems that are not shown or described to prevent obfuscation of the novel features described herein.

In certain embodiments, processor(s) 210 may include one or more microprocessors (μCs) and can be configured to control the operation of system 200. Alternatively or additionally, processor 210 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, μCs, DSPs, ASIC, programmable logic device, and the like, may be configured in other system blocks of system 200. For example, communications block 250 may include a local processor to control communication with computer 110 (e.g., via Bluetooth, Bluetooth LE, RF, IR, hardwire, ZigBee, Z-Wave, Logitech Unifying, or other communication protocol). In some embodiments, multiple processors may enable increased performance characteristics in system 200 (e.g., speed and bandwidth), however multiple processors are not required, nor necessarily germane to the novelty of the embodiments described herein. Alternatively or additionally, certain aspects of processing can be performed by analog electronic design, as would be understood by one of ordinary skill in the art.

Input detection block 220 can control the detection of button activation (e.g., main buttons, side buttons, a scroll wheel button, etc.), scroll wheel and/or trackball manipulation (e.g., rotation detection), sliders, switches, touch sensors (e.g., one and/or two-dimensional touch pads), and the like. In some embodiments, input detection block 220 can detect when a key plate (e.g., left mouse button) is depressed with a sufficient force (e.g., a threshold force) such that it contacts and activates a force sensor. The force sensor may generate a corresponding control signal (e.g., human interface device (HID) signal) to control a computing device (e.g., computer 110) communicatively coupled to the input device (e.g., instantiating a "left click" on the computer). Alternatively, the functions of input detection block 220 can be subsumed by processor 210, or in combination therewith.

In some aspects, input detection block 220 can control the operating of haptic devices implemented on an input device. For example, input signals generated by haptic devices can be received and processed by input detection block 220. For example, an input signal can be an input voltage, charge, or current generated by a piezoelectric device in response to receiving a force (e.g., user touch) on its surface. In some embodiments, input detection block 220 may control an output of one or more haptic devices on input device 130. For example, certain parameters that define characteristics of the haptic feedback can be controlled by input detection block 220. Some input and output parameters can include a press threshold, release threshold, feedback sharpness, feedback force amplitude, feedback duration, feedback frequency, over voltage (e.g., using different voltage levels at different stages), and feedback modulation over time. These characteristics are further described below. Alternatively, haptic input/output control can be performed by processor 210 or in combination therewith.

In some embodiments, input detection block 220 can detect a touch or touch gesture on one or more touch sensitive surfaces on input device 130. Input detection block 220 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of input device 130 may or may not utilize touch detection or touch sensing capabilities.

Input detection block 220 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, etc.), capacitive sensors (e.g., surface capacitance, self-capacitance, mutual capacitance, etc.), optical sensors (e.g., infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, ultrasonic sensors, etc.), or the like.

Movement tracking block 230 can be configured to track a movement of input device 130. Movement tracking block 230 can use optical sensors such as light-emitting diodes (LEDs) and an imaging array of photodiodes to detect a movement of input device 130 relative to an underlying surface. Input device 130 may optionally include movement tracking hardware that utilizes coherent (laser) light. In certain embodiments, an optical sensor is disposed on the bottom side of input device 130. Movement tracking block 230 can provide positional data (e.g., X-Y coordinate data) or lift detection data. For example, an optical sensor can detect when a user lifts input device 130 off of a work surface and can send that data to processor 210 for further processing. In some embodiments, processor 210, movement tracking block 230 (which may include an additional dedicated processor), or a combination thereof may perform some or all of the novel functions described herein including modifying a number of image sensor pixels used for different modes of operation (e.g., a first mode of operation and a second mode of operation), changing an image sensor frame rate for different modes of operation, and changing a number of memory slots used for different modes of operation, as further described below.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers (e.g., in a "3D air mouse." Accelerometers can further determine if input device 130 has been lifted off of a surface and provide movement data that may include the velocity, physical orientation, and acceleration of input device 130. In some embodiments, gyroscope(s) can be used in lieu of or in conjunction with accelerometer(s) to determine movement or input device orientation.

Power management block 240 can be configured to manage power distribution, recharging, power efficiency, and the like, for input device 130. In some embodiments, power management block 240 can include a battery (not shown), a USB-based recharging system for the battery (not shown), power management devices (e.g., low-dropout voltage regulators—not shown), and a power grid within system 200 to provide power to each subsystem (e.g., communications block 250, etc.). In certain embodiments, the functions provided by power management block 240 may be incorporated into processor(s) 210. Alternatively, some embodiments may not include a dedicated power management block. For example, functional aspects of power management block 240 may be subsumed by another block (e.g., processor(s) 210) or in combination therewith.

Communications block 250 can be configured to enable communication between input device 130 and computer 110, or other devices and/or peripherals, according to certain embodiments. Communications block 250 can be configured to provide wireless connectivity (e.g., radio-frequency (RF), Bluetooth, BLE, infra-red (IR), ZigBee, Z-Wave, Logitech Unifying, or the like) to computer 110 or other wireless devices. System 200 may include a hardwired connection to computer 110 (e.g., USB, FireWire, etc.). For example, input device 130 can be configured to receive a Universal Serial Bus (USB) cable to enable bi-directional electronic communication with computer 110 or other external devices. Some embodiments may utilize different types of cables or connection protocol standards to establish hardwired communication with other entities. In some embodiments, processor 210, communication block 250, or a combination thereof may perform some of the novel functions described herein.

Although certain systems may not expressly discussed, they should be considered as part of system 200, as would be understood by one of ordinary skill in the art. For example, system 200 may include a bus system to transfer power and/or data to and from the different systems therein. In some embodiments, system 200 may include a storage subsystem (not shown). A storage subsystem can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein.

It should be appreciated that system 200 is meant to be illustrative and that many variations and modifications are possible, as would be appreciated by one of ordinary skill in the art. System 200 can include other functions or capabilities that are not specifically described here (e.g., mobile phone, global positioning system (GPS), power management, one or more cameras, various connection ports for connecting external devices or accessories, etc.). While system 200 is described with reference to particular blocks (e.g., input detection block 220), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 200 may be combined with or operated by other sub-systems as informed by design. For example, power management block 240 and/or movement tracking block 230 may be integrated with processor(s) 210 instead of functioning as a separate entity.

Touch-and-Hold Inputs on Haptic Elements

In some embodiments, a haptic device can be implemented on an input device to operate as both an input and output user interface. For example, a haptic element (e.g., piezo-electric elements, piezo-resistive elements, etc.) can generate a charge, voltage, or current that is proportional to an amount of physical compression (e.g., user touch on the surface of haptic element) of the piezo crystal. The generated voltage (input signal) can be proportional to the input force and the input signal can be used to detect a button press (e.g., left/right button mouse click) when a threshold voltage is reached. In response to a detected button press, the same (or different) haptic element can be controlled by elements of system 200 to generate an output vibration in response to the input signal. In some embodiments, the output vibration can be tuned in a manner that may be perceived by a user as a physical depression of a mechanical key, even though the underlying surface only vibrates and does not actually deflect, shift, depress, or substantially move relative to the housing itself—it is only perceived as doing so due to the vibrational characteristics of the haptic output. The term "housing" can refer to an enclosure that operates to contain the various electronic components of an input device, and further operates as a user interface and incorporates various input elements including buttons, scroll wheels, touch sensors, etc., as mentioned above. Other input elements (e.g., scroll wheels) can be simulated in a similar manner. These haptic substitutions of conventional input elements can be advantageous as costly mechanical key plates, springs, rollers, supporting infrastructure, and the like, can be replaced by cheaper and more reliable haptic elements that are not typically subject to similar fatigue or wear-and-tear. Further, haptic elements may have very small form factors, allowing for more compact and space efficient designs.

Typically, a haptic element can accurately detect a user touch and corresponding force, as well as a user release and corresponding negative force. However, haptic elements typically are ill suited for detection of a touch-and-hold condition. This is due, in part, to the fact that piezoelectric sensors measure changes in force (or in some cases changes to pressure, acceleration, temperature, or strain) and converts that measurement into an electrical charge. For instance, an initial pressing force may be measured, but once the pressing force no longer changes (e.g., reaches a substantially steady state), the piezo device stops generating a charge. In some cases, some piezo materials may leak due to a high internal resistance, making them unsuitable to read static measurements. Thus, a press condition may be readily detected, but the hold condition may be indeterminate because there may be no corresponding generated voltage to track the hold condition. Some of the embodiments that follow address this issue.

Figure 3:
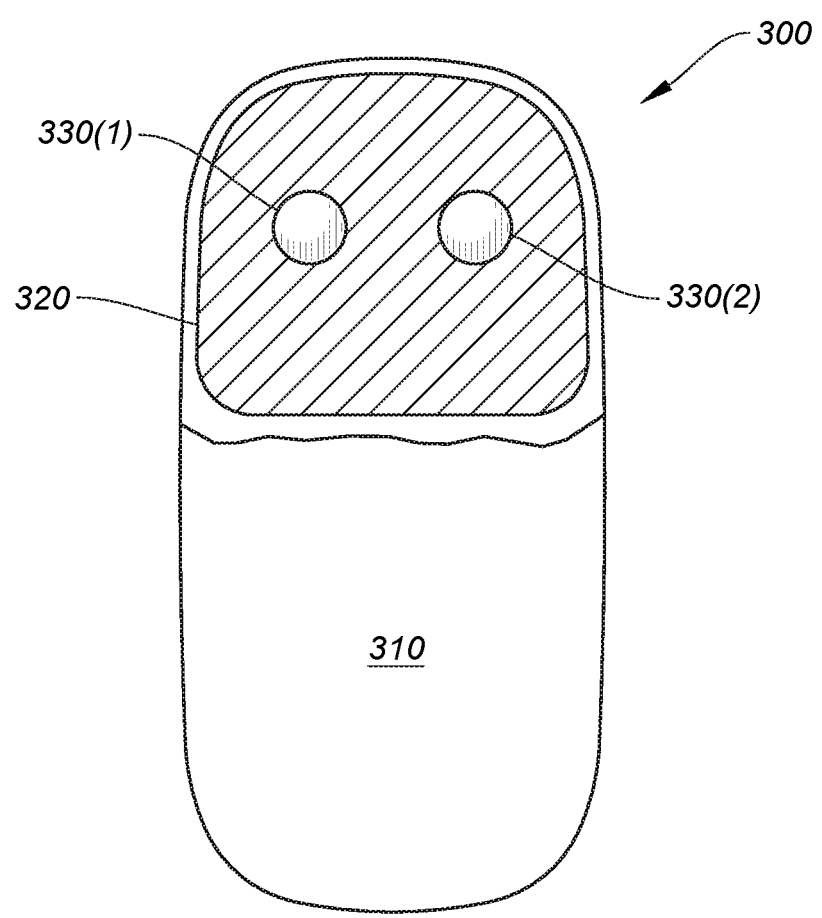
FIG. 3 shows a cutaway view of an input device with touch-sensing and haptic elements, according to certain embodiments.

FIG. 3 shows a cutaway view of input device 300 with touch-sensing and haptic elements, according to certain embodiments. Input device 300 includes housing 310, and a cutaway portion of housing 310 that exposes a touch-sensitive sensor 320 and haptic elements 330(1) and 330(2). Touch-sensitive sensor ("touch sensor") 320 is shown to cover a portion of input device 300 that can receive user inputs (e.g., user touches, taps, etc.) that operate to implement a "left click" and "right click" input function, as can be found on some contemporary mice with touch-sensitive surfaces, and as would be understood by one of ordinary skill in the art. Although haptic elements 330(1) and (2) appear to overlap touch sensor 320 in FIG. 3, it should be understood that touch sensor 320 may be able to detect touch events in these overlapping areas. Touch sensor 320 can be a capacitive sensor, force-sensing piezo-resistive sensor, resistive touch sensors, nanotube-based sensors, quantum tunneling composite, or the like. Haptic element 330(1) may be disposed in the "left click" region, and haptic element 330(2) may disposed in the "right click" region. In some embodiments, haptics devices may be linear resonant actuators, voice coil (VCM), or piezo. Touch sensor 320 and haptic elements 330 may be controlled by input detection block 220, processor 210, or a combination thereof. Haptic elements 330 and touch sensor 320 may be included within the same material stack or may be implemented separately (e.g., not vertically aligned, coupled, etc.). More or fewer haptic elements and touch sensors may be used and implemented in a variety of configuration to achieve similar results as described herein. One of ordinary skill in the art would with the benefit of this disclosure would understand the many variations, modifications, and alternative embodiments thereof.

As described above, haptic elements 330 can be used to both detect a user input (e.g., converting a change in force into a voltage) and provide a haptic output that can simulate a button press, button release, etc. To implement a reliable press-and-hold detection, touch sensor 320 can be used in conjunction with haptic elements 330. For example, haptic sensor(s) 330 may detect a pressing force from a user's finger (e.g., a force greater than a set threshold value) on a button region of housing 310 and subsequently provide a haptic sensation (haptic output) corresponding to a mechanical button depression at the button region. Meanwhile, touch sensor 320 can detect that the user's finger is still contacting the button region even after haptic element(s) 330 no longer detects the pressing force (e.g., there is no longer a change in force from the initial press), and a button press hold condition can be maintained based solely on touch sensor 320 data. When the user's finger is removed, a change in force can be detected (e.g., a negative force) by haptic element(s) 330 and an absence of a touch may be detected by touch sensor 320. Using either input as an indication of the removal of the finger, haptic device 330 can provide a haptic sensation corresponding to a mechanical button release at the button region.

Alternatively, haptic devices 330 may only be used as output devices. For example, touch sensor 320 can be used to detect when the user is contacting the touch region. Based on the touch sensor data, haptic devices 330 can generate a corresponding haptic output such that a haptic sensation corresponding to a mechanical button depression at the button region occurs in response to first detecting the presence of a user's finger in the touch region, and a haptic sensation corresponding to a mechanical button release at the button region occurs in response to no longer detecting the presence of the user's finger in the touch region. However, such implementations are configured to detect a presence of a user's finger—not an amount of force provided by the user's finger—and may be highly sensitive and subject to inadvertent key presses and releases.

In certain embodiments, another force sensitive element can be used instead of touch sensor 320. For instance, in certain embodiments input device 300 can include housing 310 having a region, haptic element(s) 330(1)-(2) coupled to housing 310, and a force-sensitive element coupled to housing 310. The haptic elements may be configured to generate a haptic feedback and couple the haptic feedback to the region of housing 310 (e.g., which can be perceived by a user). The force-sensitive element may be configured to detect a threshold input force applied-to and removed-from the region of the housing, where the force-sensitive element being different from the haptic element (e.g., not the same element). In such arrangements, the haptic element can generate a first haptic feedback (e.g., simulated button press) in response to the force-sensitive element detecting the threshold force being applied to the region of the housing, and the haptic element can generate a second haptic feedback (e.g., simulated button release) in response to the force-sensitive element detecting the threshold force being removed from to the region of the housing. In such cases, the first haptic feedback is typically different than the second haptic feedback.

Alternatively or additionally, certain embodiments may employ a charge counter or similar device to detect a press-and-hold condition. For example, a charge counter can be configured to detect a direction of electrical charge flowing into or out of a haptic (piezo) device, or detect a level of charge of a storage device (e.g., capacitor) used to store charge harvested from the piezo and/or driving the haptic device. Charge direction can be detected using input/output differential amplifier pairs, which can correspond to press and release conditions. An embodiment using a charge counter is further discussed below with respect to FIG. 6.

Figure 4:
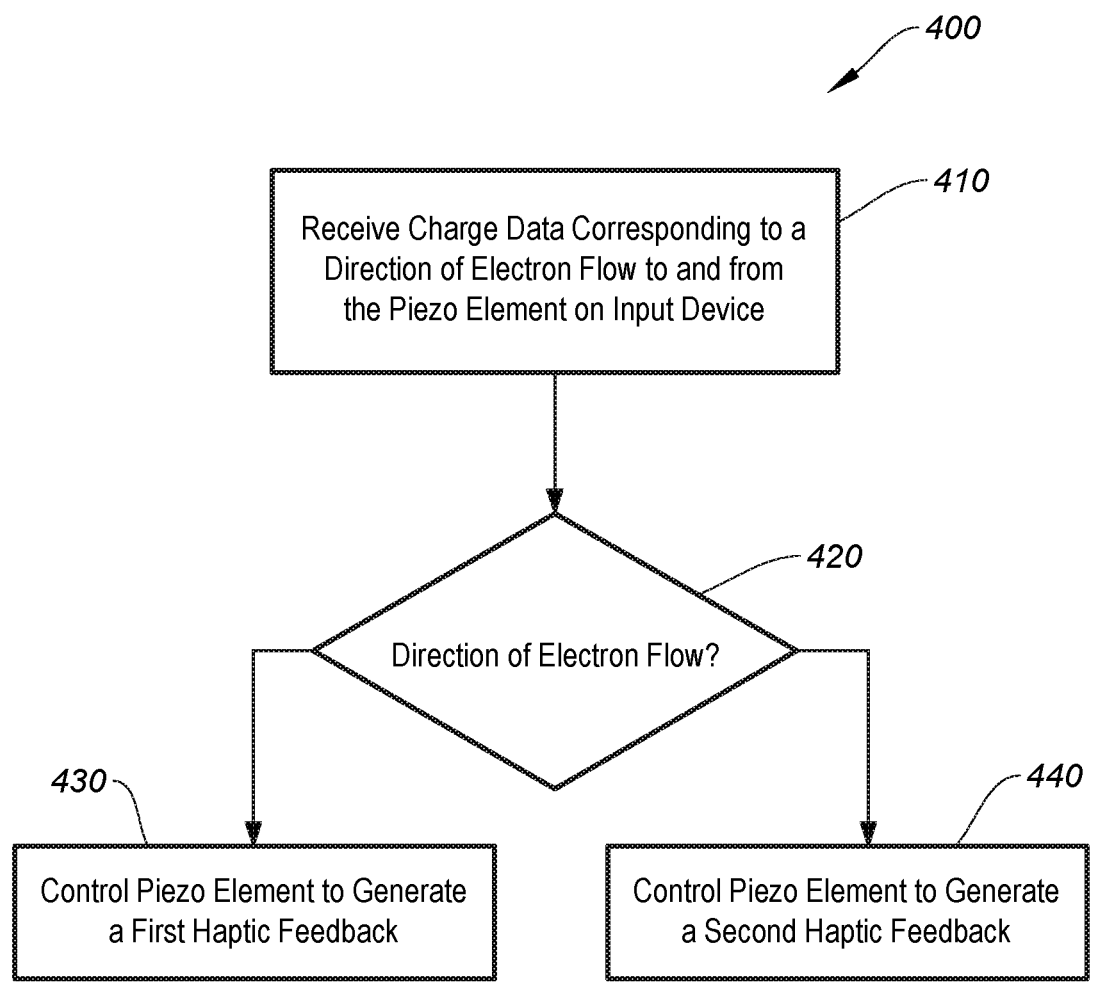
FIG. 4 is a simplified flow chart showing aspects of a method for detecting a press-and-hold input on a haptic element, according to certain embodiments.

FIG. 4 is a simplified flow chart showing aspects of a method 400 for detecting a press-and-hold input on a haptic element, according to certain embodiments. Method 400 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 400 can be performed by processor 210 of system 200, by resources in input detection block 220, or a combination thereof, as shown and described above with respect to FIG. 2.

At step 410, method 400 can include receiving charge data corresponding to a direction of electron flow to and from the piezo element 330(1) (e.g., haptic element) on input device 300. As indicated above, certain piezo-based sensor can detect a change in force and generate a corresponding (e.g., proportional) amount of voltage (charge). The change in voltage can be created by current flow to and from the piezo element in response to the applied force. A charge counter can be used to determine an amount of current flowing to and from the piezo element.

At step 420, method 400 can include determine the direction of electron flow. In some embodiments, a positive flow may correspond to an applied force to the piezo element (e.g., a button press), and a negative flow may correspond to a release of an applied force to the piezo element (e.g., a button release). In some cases, a positive flow may correspond to a button release and a negative flow may correspond to a button press.

At step 430, method 400 can include controlling piezo element to generate a first haptic feedback in response to charge data corresponding to a first direction of electron flow. For instance, if the first direction of electron flow corresponds to a button press, a haptic feedback that simulates a mechanical button press can be employed, as discussed above with respect to FIG. 3.

At step 440, method 400 can include controlling piezo element to generate a second haptic feedback in response to charge data corresponding to a second direction of electron flow. For instance, if the second direction of electron flow corresponds to a button release, a haptic feedback that simulates a mechanical button release can be employed, as discussed above with respect to FIG. 3. In the case where a button press is detected (step 430), a press-and-hold condition can be maintained until an opposite flow is detected (step 440).

It should be appreciated that the specific steps illustrated in FIG. 4 provide a particular method 400 for detecting a press-and-hold input on a haptic element, according to certain embodiments. Other sequences of steps may also be performed according to alternative embodiments. For example, alternative embodiments may perform the steps outlined above in a different order. Moreover, the individual steps illustrated in FIG. 4 may include multiple sub-steps that may be performed in various sequences as appropriate to the individual step. For example, some steps may include driving a haptic element using a particular profile selection to help lower activation noise of the haptic element. In some cases, additional steps may be added or removed depending on the particular applications. One of ordinary skill in the art would understand the many variations, modifications, and alternative embodiments thereof.

In further implementations, press-and-hold can be determined by minimally exciting a piezo and characterizing the response to determine if the piezo is depressed. For example, a piezo element can be excited by an output signal that may cause the piezo to vibrate below a threshold that may be perceived by a user. The element can be configured to provide a first response when deformed to a first state due to a force provided by a user of an input device. The same piezo element can be configured to provide a second response when in a nominal state corresponding to a user not providing a force to the piezo. A state of the piezo may be determined depending on whether a corresponding first or second response is received as a response of an excitation signal. For example, a piezo element may be configured with functionality such that a current path is blocked with the piezo is deformed, or vice versa.

Using Haptic Elements to Simulate a Mechanical Scroll Wheel

Figure 5A:
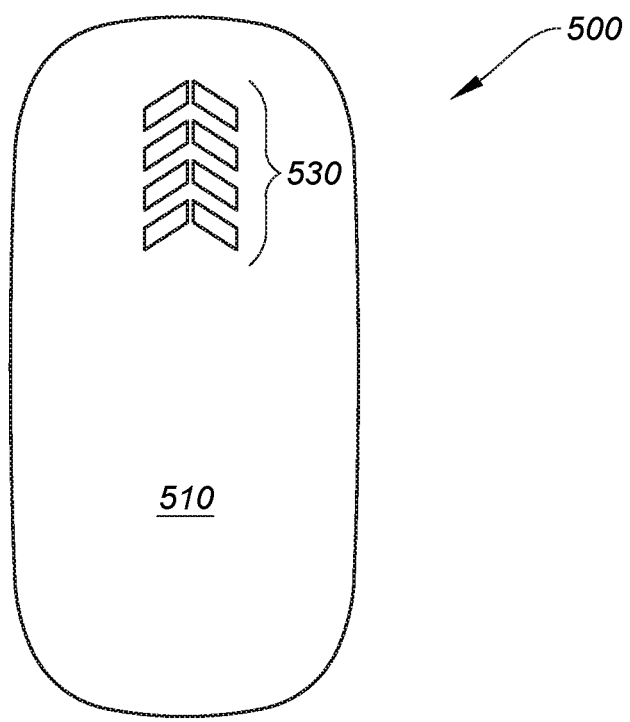
FIG. 5A shows an input device with multiple haptic elements configured to simulate a mechanical scroll wheel, according to certain embodiments.

FIG. 5A shows input device 500 with multiple haptic elements 530 configured to simulate a mechanical scroll wheel, according to certain embodiments. Input device 500 includes housing 510 and a group of haptic elements 530 disposed on housing 510 or coupled thereto. Haptic elements 530 are shown as a number of divided chevron-shaped elements, although any suitable shape may be used. Haptic sensors formed in a chevron configuration may provide improved force resolution (e.g. how force is distributed) over an area as compared to round shapes, which generally cannot be as densely arranged on a surface. Using divided chevrons can allow for the detection of an applied force on one side of the chevron versus the other. Some embodiments may use complete chevron shapes (no division), however they may not be configured to detect force on one side of the haptic element versus the other (e.g., haptic devices may be monolithic). Other haptic sensor shapes that may be well-suited for dense grouping patterns include rectangles, squares, triangular shapes, and the like, as would be understood by one of ordinary skill in the art. Using groups of force-sensing haptic devices in the manner shown can be used to simulate a feel of a mechanical scroll wheel (e.g., rotation), including some of the secondary functions typically associated with scroll wheels including a button press (e.g., depressing a scroll wheel) and tilting a scroll wheel, as further described below with respect to FIGS. 5B-5D.

Figure 5B:
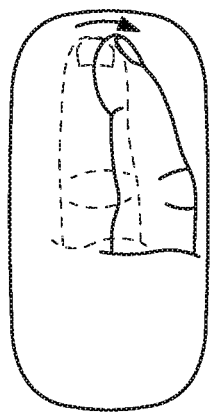
FIG. 5B shows a user interfacing with an input device having multiple haptic elements to implement a simulated scroll wheel tilt function, according to certain embodiments.

FIG. 5B shows a user interfacing with an input device having multiple haptic elements (obscured by the user's finger) to implement a simulated scroll wheel tilt function, according to certain embodiments. Haptic elements 530, as described above, can be force sensitive elements to detect a force—typically provided by a user's finger. Referring to FIG. 5B, a user rests his finger on haptic elements 530 and rotates/shifts his finger to the right, which corresponds to a similar force that would be provided to tilt a mechanical scroll wheel on a conventional mouse. The transfer of a substantially uniform force over each side of each chevron to one side can trigger the tilt function. In response to detecting a tilt function, one or more haptic elements 530 may subsequently provide a haptic output that is tuned to feel like a mechanical tilt of a scroll wheel and may have a directional feel to it. In some embodiments, a certain threshold tilt force and a downwards force may be used to initiate a tilt function, which can help avoid inadvertent triggering when, for example, a user is simply readjusting their hand and not intending to initiate a tilt trigger. Tuning the output to achieve different simulated mechanical characteristics are further described below.

Figure 5C:
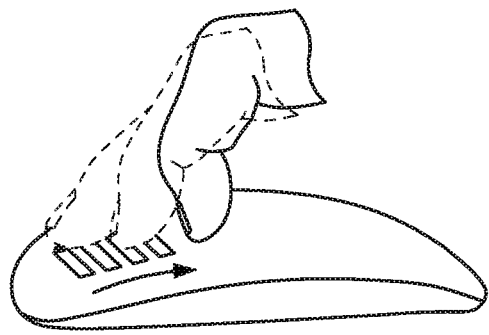
FIG. 5C shows a user interfacing with an input device having multiple haptic elements to implement a simulated scroll wheel rotation, according to certain embodiments.

FIG. 5C shows a user interfacing with an input device having multiple haptic elements to implement a simulated scroll wheel rotation, according to certain embodiments. The user is shown swiping his finger along haptic elements 530 similar to how a user might move his finger to rotate a mechanical scroll wheel on a conventional mouse. The transfer of a substantially uniform force in succession over the individual haptic elements can trigger the scroll function. For example, swiping upwards can be detected by haptic elements 530 and interpreted as a "scroll up" function. Similarly, swiping downwards can be interpreted as a "scroll down" function. In response to detecting a scroll function, one or more haptic elements 530 may subsequently provide a haptic output that is tuned to feel like a rotation of a mechanical scroll wheel.

Figure 5D:
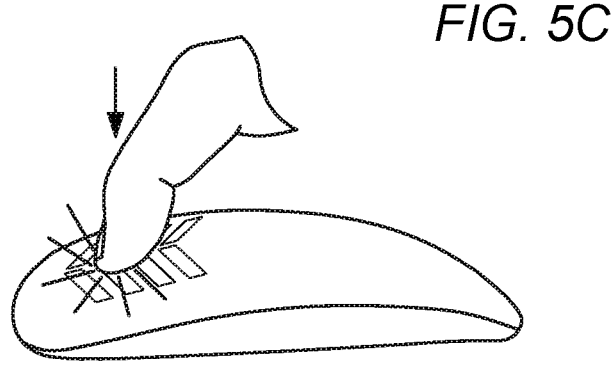
FIG. 5D shows a user interfacing with an input device having multiple haptic elements to implement a simulated scroll wheel button press function, according to certain embodiments.

FIG. 5D shows a user interfacing with an input device having multiple haptic elements to implement a simulated scroll wheel button press function, according to certain embodiments. The user is shown pressing his finger in place on certain haptic elements 530, similar to how a user might depress a mechanical scroll wheel on a conventional mouse. The detected force applied in a single location (e.g., in the center of the stack of chevron-shaped haptic sensors 530) may trigger a scroll wheel button press function. In response to detecting the scroll wheel button press function, one or more haptic elements 530 may subsequently provide a haptic output that is tuned to feel like a button press.

In some embodiments, haptic sensors can be applied to different types of surfaces to further enhance the user experience.

Figure 6:
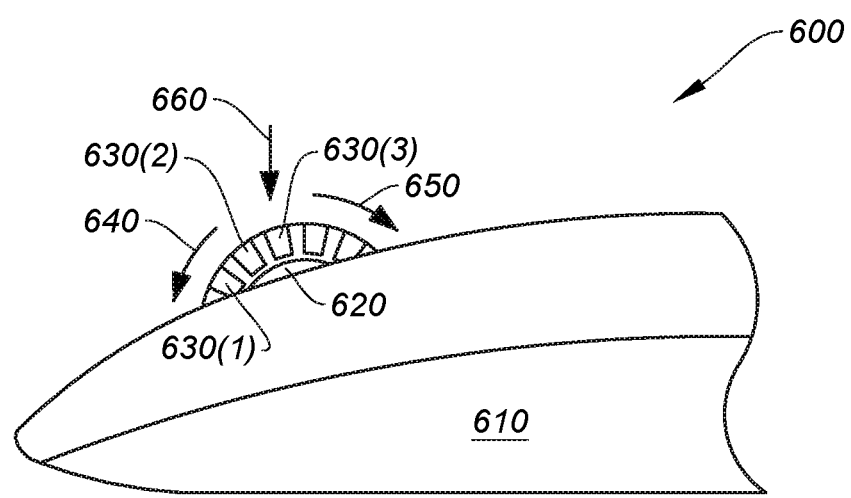
FIG. 6 shows an input device with multiple haptic elements configured to simulate a mechanical scroll wheel, according to certain embodiments.

FIG. 6 shows input device 600 with multiple haptic elements 630 configured on a protrusion 620 to simulate both a look and feel of a mechanical scroll wheel, according to certain embodiments. Protrusion 620 may also be referred to as an interface element. Input device 600 includes housing 610 and protrusion 620 disposed thereon. Protrusion 620 includes a number of haptic elements 630 disposed thereon. Alternatively, protrusion 620 may have fewer haptic elements, as the output of one haptic element can be configured to output a vibration that feels like it is coming from multiple locations, or has a directional quality to it. In some embodiments, protrusion 620 can look similar to a mechanical scroll wheel, but may not function in a similar manner. For example, protrusion 620 may simply be a non-functional replica of a scroll wheel that does not tilt, rotate, or depress like its mechanical counterpart. The embodiments shown in FIG. 6 may function in a similar manner as FIGS. 5A-5D, but can further provide a more tactile contour on input device that can enhance the authenticity of haptic feedback corresponding to scroll wheel actions. For example, when protrusion 620 is pressed from a left side or right side, a corresponding haptic sensor may detect the force (assuming a force sensing capability to differentiate between a force on either side of protrusion 620), a tilt function can be implemented (e.g., by processor 210), and a haptic output may generate a vibrational sensation similar to what a tilt on a mechanical scroll wheel would feel like, as described above with respect to FIG. 5B. Moving one's finger along path 640 or 650 may generate a scroll function and corresponding haptic output, as described above with respect to FIG. 5C. Finally, a force 660 on protrusion 620 may initiate a button press function and a corresponding haptic output, as described above with respect to FIG. 5D. One of ordinary skill in the art would understand the many variations, modifications, and alternative embodiments thereof.

In some embodiments, there may be a functional rotating scroll wheel with haptics implemented to simulate only the tilt function. The mechanics and manufacturing required for a tilt scroll wheel can be very complex and expensive. For example, a user can be very sensitive to mild "wiggle" sensations from scroll wheels. For premium products, a scroll wheel should feel firm and tight with respect to side-to-side movements. When activated to tilt, the resulting movement should feel very deliberate. This adds to the challenges of a mechanical implementation. Thus, in certain embodiments haptic elements can be added to a rotating scroll wheel, adding tilt functionality. The haptic element may be mounted directly within the rotating scroll wheel, on or within the hub (internal region of the scroll wheel), or on the structure connecting the scroll wheel to the housing. The system may be configured to detect the angle/rotation of the scroll wheel at the time of triggering the tilt to provide the appropriate feedback sensation. For example, the system may be able to determine which portion of the scroll wheel is in the uppermost position, and configure the haptic response to target that area, which is a likely location of where a user's finger would be located.

Determining a Haptic Output Based on a User Input

Figure 7:
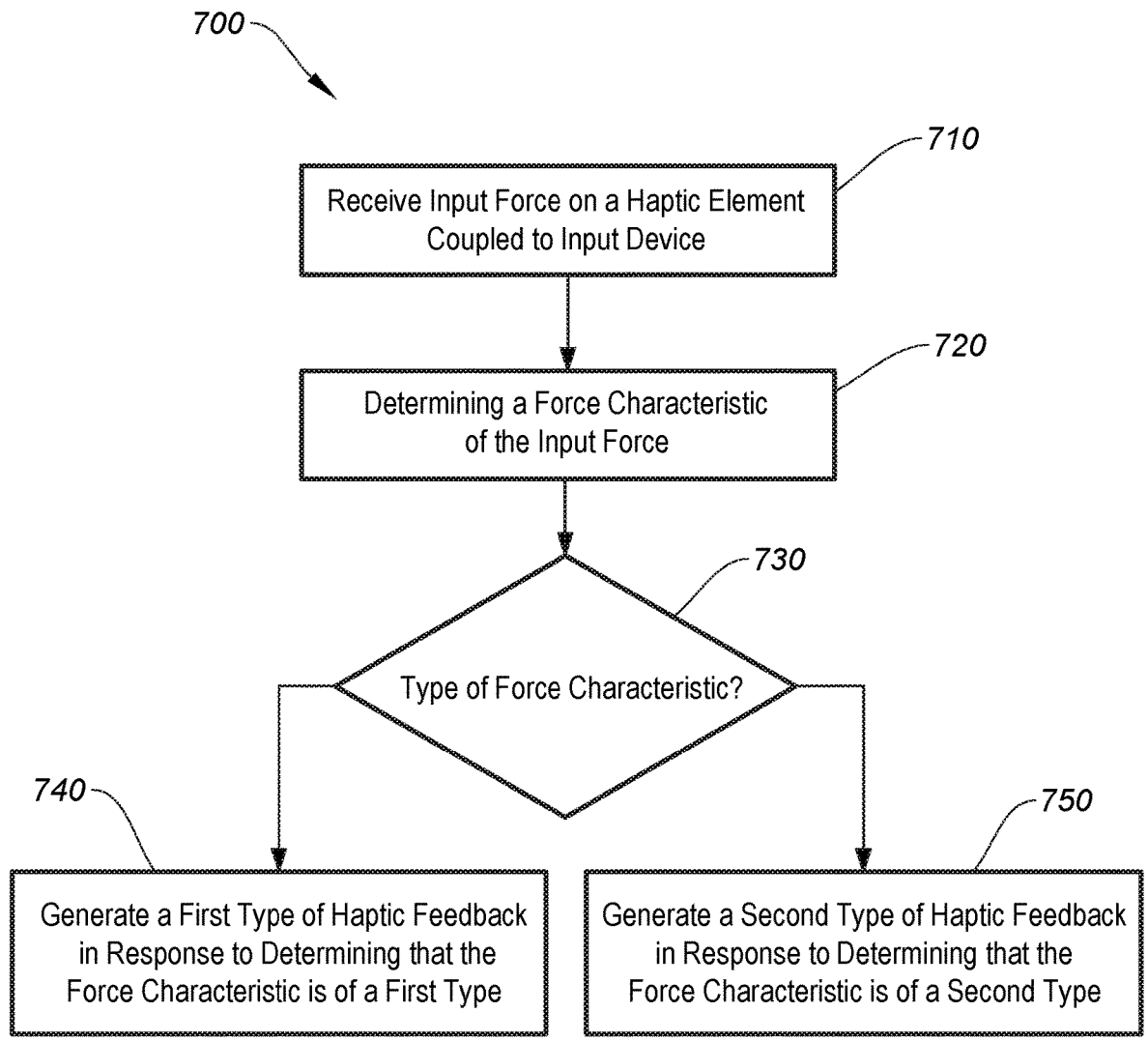
FIG. 7 is a simplified flow chart showing aspects of a method for determining a type of haptic output to generate in response to a user input, according to certain embodiments.

FIG. 7 is a simplified flow chart showing aspects of a method 700 for determining a type of haptic output to generate in response to a user input, according to certain embodiments. Method 700 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 700 can be performed by processor 210 of system 200, by resources in input detection block 220, or a combination thereof, as shown and described above with respect to FIG. 2. By way of example, the input device and haptic element can correspond to any as shown in FIGS. 1-12C.

At step 710, method 700 can include receiving an input force on a force-sensing haptic element coupled to an input device. The input force can be provided by a user (e.g., user's finger), or other input means.

At step 720, method 700 can include determining a force characteristic of the input force. For example, a force characteristic may correspond to a stationary pressing force substantially normal to a surface of the haptic element, or the force characteristic may correspond to a force sliding along the surface of the haptic element. Other force characteristics are possible including a varying (pulsing) force, intermittent force (e.g., non-uniform application), increasing force, decreasing force, and the like, as would be understood by one of ordinary skill in the art.

At step 730, in response to determine the type of force characteristic to be of a first type, method 700 can include generating a first type of haptic feedback in response to determining that the force characteristic is of a first type (step 740), or generating a second type of haptic feedback in response to determining that the force characteristic is of a second type (step 750). In some embodiments, the first type of haptic feedback can simulate a button press action if the first type of input force is a stationary pressing force on the haptic element, and the second type of haptic feedback may simulate a wheel rotation action if the second type of input force corresponds to a force sliding along the surface of the haptic element. In some cases, the wheel rotation action can include simulated wheel rotation characteristics including a simulated rotational friction, a simulated ratcheted rotation, a simulated ratchetless rotation, or any suitable combination thereof.

It should be appreciated that the specific steps illustrated in FIG. 7 provide a particular method 700 for determining a type of haptic output to generate in response to a user input, according to certain embodiments. Other sequences of steps may also be performed, according to alternative embodiments. For example, alternative embodiments may perform the steps outlined above in a different order. Moreover, the individual steps illustrated in FIG. 7 may include multiple sub-steps that may be performed in various sequences as appropriate to the individual step. In some cases, additional steps may be added or removed depending on the particular applications. For example, some embodiments may further modulate the wheel rotation action by changing the haptic output to simulate a rotational friction, a ratcheted rotation, or a ratchetless rotation. One of ordinary skill in the art would understand the many variations, modifications, and alternative embodiments thereof.

Methods of Simulating a Multi-Mode Physical Scroll Wheel Using Haptic Elements

In some embodiments, rotational characteristics of a physical scroll wheel for a mouse can be simulated using haptic elements. A physical scroll wheel may often have a ratcheted rotation, free wheel rotation, or constant friction rotation, as would be appreciated by one of ordinary skill in the art. The following example waveforms show how certain rotational characteristics for physical scroll wheels may be realized using various haptic feedback patterns.

Figure 8A:
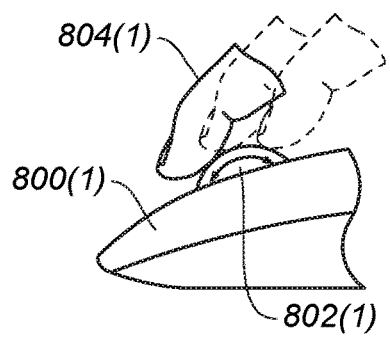
FIG. 8A depicts a graph showing a haptic output generated by a haptic element simulating a constant, high-friction rotation as found in some physical scroll wheel systems, according to certain embodiments.
Figure 8A:
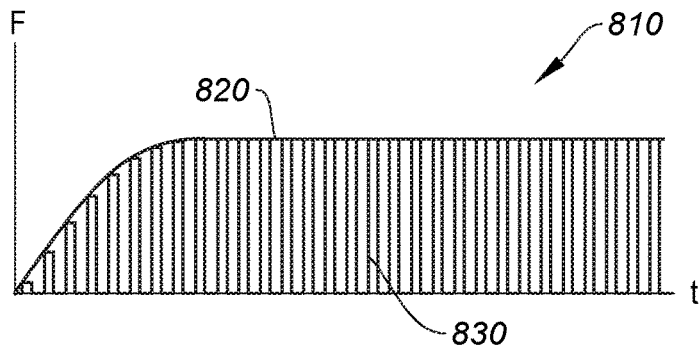

FIG. 8A depicts a graph showing a haptic output generated by a haptic element simulating a constant, high-friction rotation as found in some physical scroll wheel systems, according to certain embodiments. The user 804(1) is shown rotating scroll wheel 802(1) on a computer mouse 800(1) in a smooth fashion, but with a consistent resistance. Graph 810 shows an idealized force curve 820. In some embodiments, one or more haptic elements may be pulsed at a relatively fast rate with high intensity to simulate a resistance. For example, square wave 830 may provide a pulsed feedback that, to a user (at finger 804(1)), may be perceived as a smooth resistance to movement (e.g., on a surface or protrusion, as shown on FIGS. 5A and 6, respectively). For more context with respect to FIGS. 8A-8C, a ratchet force can be approximately 2 mNm (0.002 Nm), a friction force can be approximately 0.5 mNm (0.0005 Nm), and a free wheel force can be approximately 0.01 mNm. It can be assumed for the sake of simplification that the graphs of FIGS. 8A-8C correspond to these values as they ramp up to the peak values shown, however one having ordinary skill in the art would understand that these values are merely examples and high or lower forces can be used that may deviate from as little as <1% to over 100% of the values provided above. Referring to FIG. 8A, square wave 830 may operate at any suitable frequency, which can typically be above 1 kHz to achieve a user experience that may correspond to a constant frictional force, as shown.

Figure 8B:
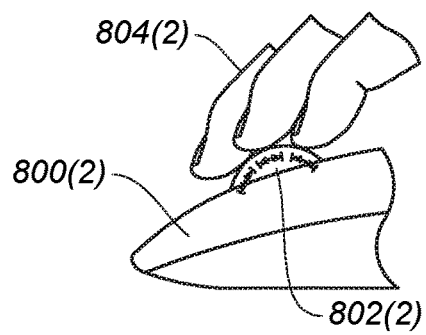
FIG. 8B depicts a graph showing a haptic output generated by a haptic element simulating a ratcheted rotation as found in some physical scroll wheel systems, according to certain embodiments.
Figure 8B:
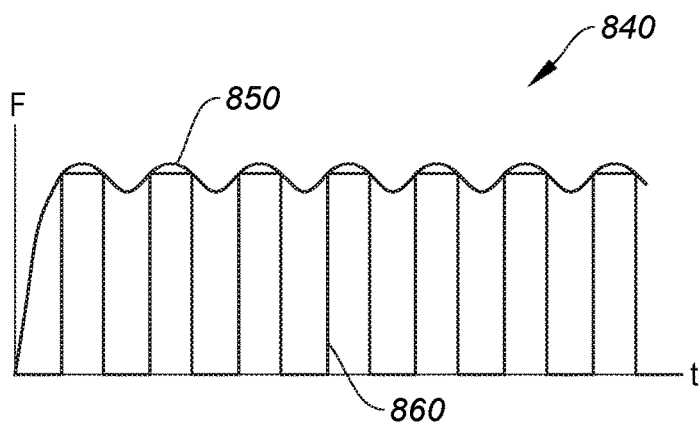

FIG. 8B depicts a graph showing a haptic output generated by a haptic element simulating a ratcheted rotation as found in some physical scroll wheel systems, according to certain embodiments. User 804(2) is shown rotating scroll wheel 802(2) on a computer mouse 800(1) in a ratcheted fashion, as would be understood by one of ordinary skill in the art with the benefit of this disclosure. Graph 840 shows an idealized force curve 850. A typical force curve for a ratcheted rotation may require approximately 2 mNm of force to rotate. The resistance can reach a value that has a relatively consistent and intermittent force profile as the physical scroll wheel is rotated. In some embodiments, one or more haptic elements may be pulsed at a relatively slower rate (e.g., <1 KHz, 200 kHz, etc.) and high intensity simulate a ratcheted rotation in a scroll wheel. For example, square wave 860 may provide a pulsed feedback that, to a user (at finger 804(2)), may be perceived as an intermittent resistance to movement.

Figure 8C:
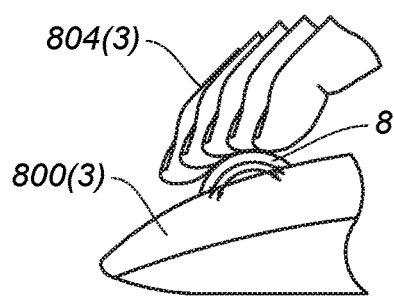
FIG. 8C shows a haptic output generated by a haptic element simulating a freewheel rotation as found in some physical scroll wheel systems, according to certain embodiments.
Figure 8C:
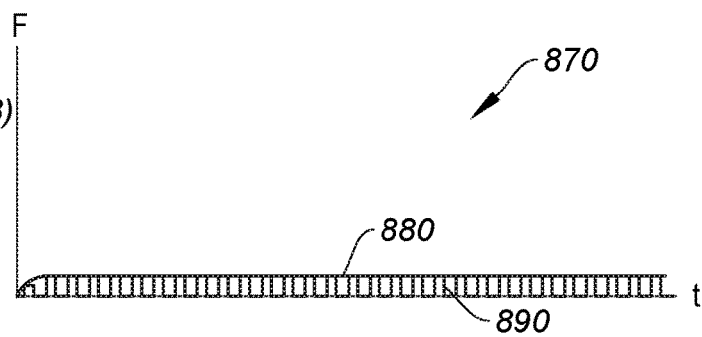

FIG. 8C shows a haptic output generated by a haptic element simulating a freewheel rotation as found in some physical scroll wheel systems, according to certain embodiments. User 804(3) is shown rotating scroll wheel 802(3) on a computer mouse 800(3) in a freewheel fashion, as would be understood by one of ordinary skill in the art with the benefit of this disclosure. Graph 870 shows an idealized force curve 880. A typical force curve for a freewheel rotation may require approximately 0.01 mNm of force or less to rotate. The resistance can reach a value that has a relatively low and consistent force profile as the physical scroll wheel is rotated. In some embodiments, one or more haptic elements may be pulsed at a relatively fast rate (e.g., 1 kHz or more) with a low intensity to simulate a ratcheted rotational experience. For example, square wave 890 may provide a pulsed feedback that, to a user (at finger 804(2)), may be perceived as a smooth, low resistance to movement. In some implementations, other tunable parameters that can affect how the generated haptic feedback feels to a user can include a press threshold (amount of force required to trigger a button press), a release threshold, feedback sharpness (e.g., this can be a slew rate and/or duty cycle of a signal for driving a piezo for haptic feedback), a feedback force amplitude, a feedback duration (e.g., for a single action—button press feedback), feedback frequency (e.g., 300 Hz), and feedback modulation (variation of feedback amplitude, frequency, or phase over time). Thus haptic elements can be used to achieve a similar feel as mechanical switches in a number of ways including achieving a sharper feeling with a click, differentiated press/release thresholds and feedbacks, and overall familiar sensation.

In some cases, other waveforms can be used other than square waves. For instance, rounded square waves, sine waves, triangle waves, saw-tooth waves, etc., may be used. Varying perceived resistances (e.g., modulating amplitude, etc.) may be applied, and any combination of the above referenced tunable parameters may be applied in any combination, order, amount, etc., to achieve the desired haptic effect. Multiple haptic elements can be used with their individual tunable parameters being modifiable independently or dependently on one or more other haptic elements to further vary and increase the number of haptic possibilities. One of ordinary skill in the art with the benefit of this disclosure would understand the many variations, modifications, and alternative embodiments thereof.

Figure 9:
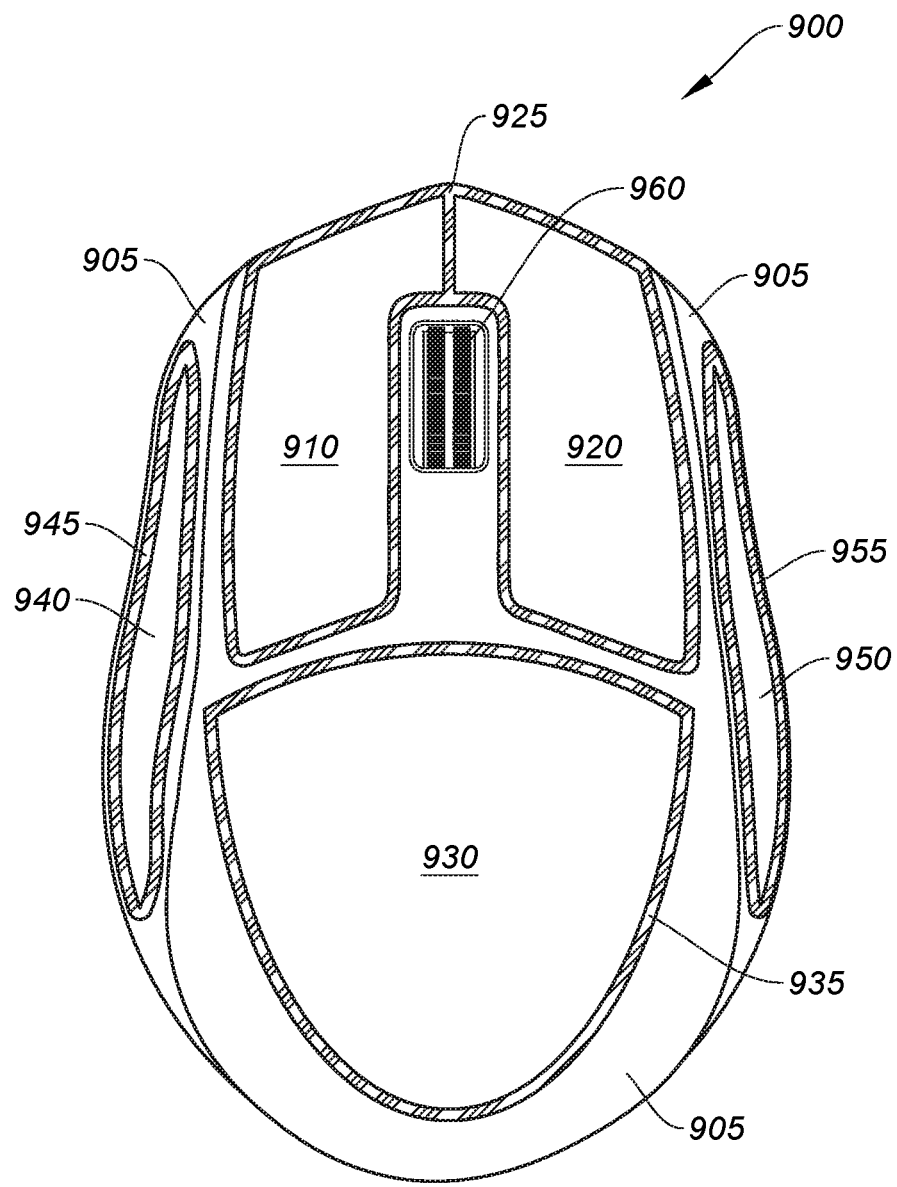
FIG. 9 shows an input device with a dampening material disposed around haptic-based input/output element, according to certain embodiments.

Limiting Vibrational Propagation on an Input Device—Vibration Absorption Materials FIG. 9 shows an input device 900 with a dampening material disposed around haptic-based input/output element, according to certain embodiments. Specifically, FIG. 9 depicts input device 900 with housing 905 and left button 910, right button 920, palm region 930, thumb region 940, and pinky region 950 disposed thereon. A vibration absorption material (also referred to as "dampening material") may be disposed around each region that can prevent or reduce vibration from traversing beyond an intended area. For instance, vibration absorption materials 925, 935, 945, 955 can be configured around buttons 910/920, palm region 930, thumb region 940, and pinky region 950, respectively. Thus, haptic feedback generated on button 910 may be absorbed (e.g., reduced or eliminated) as the vibrations reach the vibration absorption materials propagate beyond the area defined by button 910.

The vibration absorption materials can include silicon-based plastics, neoprene, various forms of thermoplastic polyurethane (TPU), polyurethane (PU), rubber compounds, and the like. The dampening material can operate to reduce or prevent vibrations caused by haptic elements in one area (e.g., left button 920) from traversing to other areas (e.g., right button 930, other portions of housing 910, etc.). In some cases, dampening materials may be applied laterally around and/or below the perimeters of certain features with haptic elements (e.g., below the left/right buttons). Any suitable manner of applying the dampening materials during manufacturing may be applied. Dampening materials can be homogenous or heterogeneous (e.g., a combination of materials). In some cases, vibration absorption materials may be placed in a continuous or non-continuous fashion (e.g., materials may fully surround a feature or may be sparsely configured in certain areas). In some cases, air gaps may be used to prevent the propagation of vibrations to adjacent sections. For example, instead of a vibration absorption material, an air gap may exist where vibration absorption material 945 is shown in FIG. 9. One of ordinary skill in the art with the benefit of this disclosure would understand the many variations, modifications, and alternative embodiments thereof.

In another example, some embodiments of an input device (e.g., computer mouse) can include a housing configured to be interfaced with by a user, the housing including a left mouse button coupled to a first haptic element, a right mouse button coupled to a second haptic element, and a palm support region coupled to a third haptic element. The input device can include one or more processors configured to receive and process control signals generated by and received from the left mouse button and right mouse button. For instance, a control signal can be a signal indicating a left mouse button click or a right mouse button click has occurred. Other functions and combinations thereof are possible. The one or more processors can be configured to control the operation of the first, second, and third haptic elements (i.e., the total number of haptic elements being used or a subset thereof). A vibration absorption material may be included that is configured around a perimeter of at least one of the left mouse button, the right mouse button, or the palm support region. As indicated above, the vibration absorption material may be configured to absorb and prevent vibrations generated by each haptic element to traverse beyond the corresponding perimeter it is configured within and on to other areas of the surrounding housing, as further discussed below with respect to FIG. 10B. Other regions can be included including a thumb support region and/or pinky support region, each with a corresponding vibration absorption material configured around their corresponding perimeters. Each additional region may also be coupled to one or more haptic elements, which can also be controlled by the one or more processors. The haptic elements can be piezoelectric transducers, acoustic transducers (e.g., a voice coil, ultrasonic transducers or ultra-haptics, air vortex rings), eccentric rotating mass actuators, or the like.

Limiting Vibrational Propagation on an Input Device—Tuned Body Panels

In some embodiments, one or more body panels, the housing, or other structures on an input device may have a resonant frequency. One or more haptic elements may be tuned to vibrate at the resonant frequency, which may cause the amplitude of the haptic-element-induced vibrations to be amplified. In some cases, tuned body panels may provide for lower power implementations as less power may be needed to generate a particular vibrational intensity due to the amplifying characteristics of providing haptic vibrations at the resonant frequency. Alternatively or additionally, haptics elements may be set to a fixed frequency or set of frequencies of operation, and the body panels may be manufactured or adjusted to match or closely match its resonant frequency to the frequencies that are output by the corresponding haptic elements.

Figure 10A:
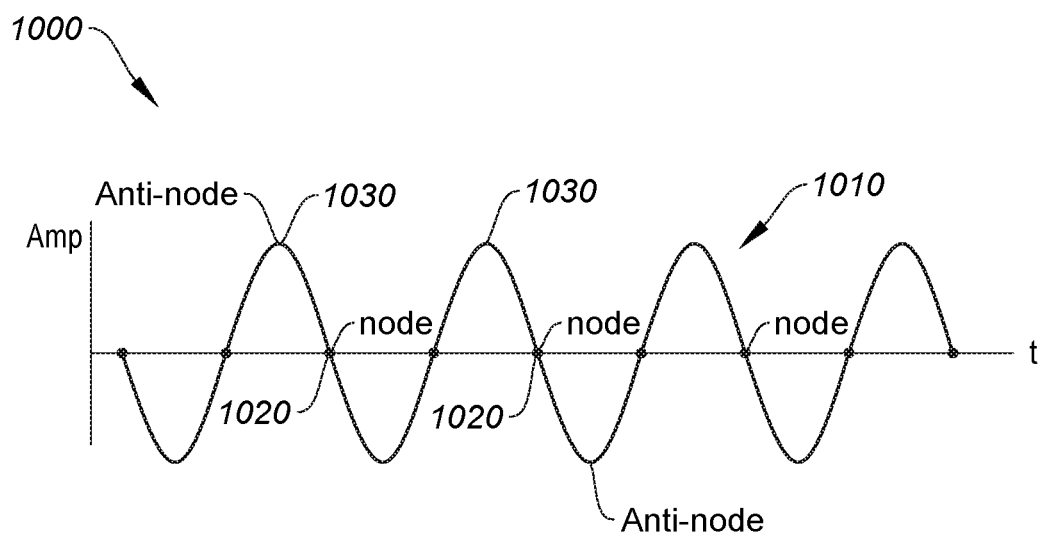
FIG. 10A, an idealized sinusoidal waveform is shown that may correspond to a vibration generated by a haptic element.
Figure 10B:
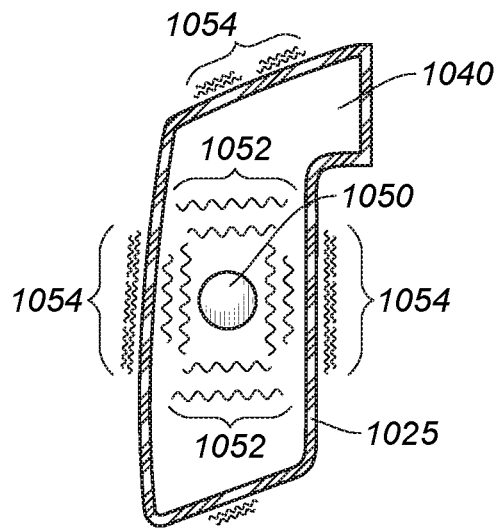
FIG. 10B shows a left button of an input device with a haptic element coupled thereto, according to certain embodiments.

Referring to FIG. 10A, an idealized sinusoidal waveform 1000 is shown that may correspond to a vibration generated by a haptic element. Waveform 1000 includes a number of peaks 1030 ("anti-nodes") where the vibration is at a peak amplitude, and a number of nodes 1020 where the vibration is at a zero amplitude. In some embodiments, haptic elements may be placed such that areas that are intended to vibrate are subject to anti-nodes of the underlying haptic vibration, and areas that are not intended to vibrate (e.g., areas outside or near an edge of the region of interest) are subject to the nodes of the underlying haptic vibration. By way of example, FIG. 10B shows a left button 1040 of an input device with a haptic element 1050 coupled thereto, according to certain embodiments. As haptic element 1050 vibrates, areas of left button 1040 proper may be subject to vibrations 1052 that are at or near antinodes 1030. In contrast, areas that are not intended to vibrate (e.g., areas at or beyond an edge perimeter of button 1040) may be subject to vibrations 1054 that are at or near nodes 1020 of the underlying waveform.

Figure 10C:
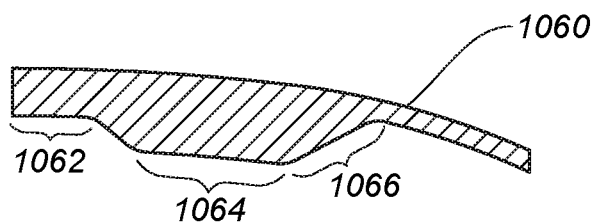
FIG. 10C shows a cross-sectional view of a button on an input device is shown, according to certain embodiments.

A number of factors may affect the resonant frequency of one or more features (e.g., button, housing, panel, etc.) of an input device (e.g., computer mouse). For example, a type of material, material dimensions, homogenous/heterogeneous materials, etc., may be utilized to affect the resonant frequency of the corresponding feature. Referring to FIG. 10C, a cross-sectional view of a button 1060 on an input device is shown, where button 1060 may be contoured to have varying thicknesses 1062, 1064, 1066 to affect the corresponding resonant frequency. In some cases, another haptic element may be used to induce a negative feedback and cancel vibrations in certain areas. For instance, a first haptic element may generate a vibration, while a second haptic element may generate a vibration that suppresses the first vibration such that haptic feedback can be corralled into particular areas, even where the haptic feedback propagates beyond an intended region.

In some embodiments, the input structure may be contoured to have a resonant frequency at a center portion of the input structure, and contoured to have one or more nodes at an outer edge of the input structure, such that vibrations at the resonant frequency on the input structure are of a lower amplitude at the outer edge than at the center portion.

In certain embodiments, adjacent structures may be tuned to different resonant frequencies such that vibrations entering a particular structure from an adjacent area are attenuated due to the different tunings.

In some implementations, haptic element can be mounted in the center of an input structure, off to one side, or moved further away from the intended structure (e.g., by adding additional intervening layers, materials, structures between the haptic element and input structure) to achieve varying effects. A thickness, rigidity, shape, and material properties of the input structure can impact haptic feedback.

In certain embodiments, certain haptic feedback parameters can be tuned to change feedback characteristics. For example, haptic feedback can be tuned to feel like a physical button press, button release, scroll wheel rotation, and a number of other haptic sensations. As indicated above, some of the tunable parameters include a press threshold, a release threshold, feedback sharpness, a feedback force amplitude, a feedback duration, feedback frequency, and feedback modulation. Thus haptic elements can be used to achieve a similar feel as mechanical switches in a number of ways including achieving a sharper feeling with a click, differentiated press/release thresholds and feedbacks, and overall familiar sensation. What can be improved with haptic elements may include lower noise (no moving mechanical parts), custom feedback to user preference, contextual feedback (e.g., haptic feedback may be different when interacting with different screen elements), allowing system feedback (e.g., getting feedback determine by the system, not a reaction to a user, allow dual (or more) clicking thresholds, and more. Further, haptic elements can also be implemented in keyboards, presenter devices, speakers, or any suitable device.

Tunable Solid State Switch Travel and Stiffness Adjustments

In some embodiments, left/right buttons 910/920 (or other button) may not be mechanically functional. That is, left/right buttons 910/920 may appear to be buttons, but may be mechanically inoperable such that they do not move (e.g., depress/release) in response to a force. In such cases, one or more haptic sensors may be configured to provide a haptic feedback to give the impression of a button press, as further described above. Some embodiments may include mechanically inoperable buttons that can still flex under a force, but do not perform any mechanical function.

Figure 11:
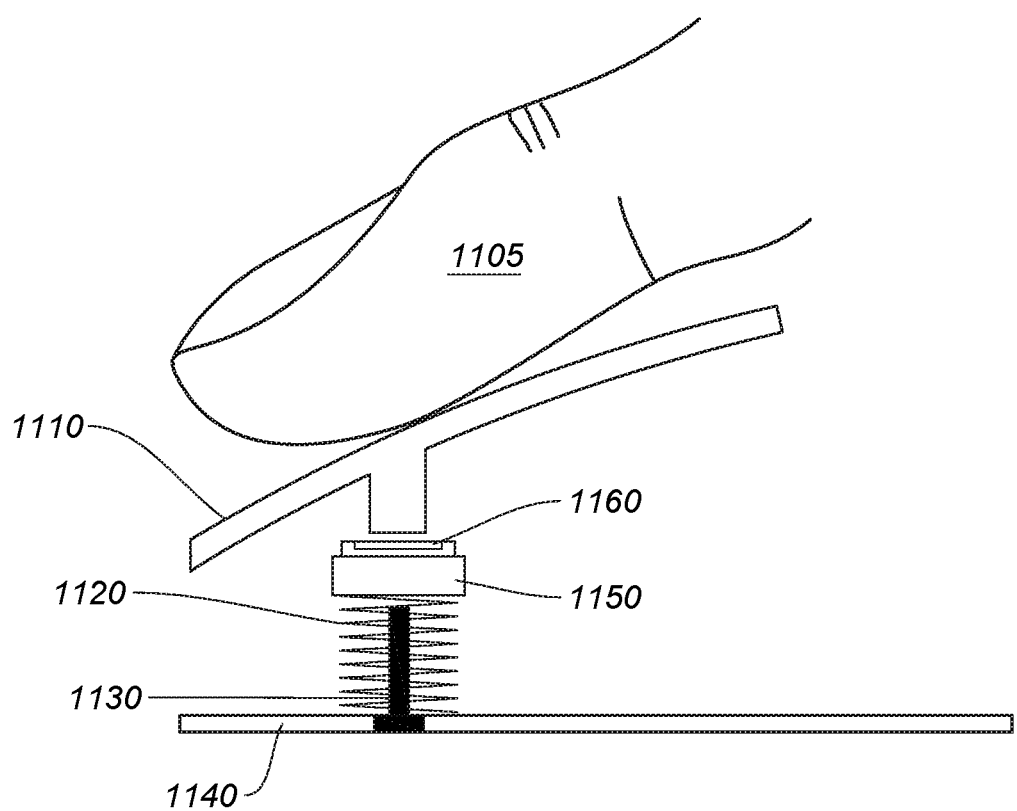
FIG. 11 shows a solid state button with an adjustable key plate travel being operated by a user 1105, according to certain embodiments.

Alternatively, a button may be mechanically depressible to provide a better user experience, however a haptic element can be used to provide a haptic feedback to indicate that a button press has been instantiated instead of a mechanical element (e.g., mechanical switch) as used in certain contemporary input devices. For example, FIG. 11 shows a solid state button with an adjustable key plate travel being operated by a user 1105, according to certain embodiments. The button can include a key plate 1110, restoration element 1120, adjustment element 1130, bottom case 1140, haptic element support 1150, and haptic element 1160. Restoration element 1120 can be a mechanical spring, a foam, rubber, or other device that can be depressible and allow key plate 1110 to travel downwards (away) from a starting position when a force is applied by user 1105, and provide a restoration force to move the key plate 1100 back to the starting position. Adjustment element 1130 can be configured to adjust how much key plate 1100 can travel in response to receiving a depression force by user 1105. Bottom case 1140 may be any suitable platform in the input device that can operate as a support for the key plate assembly discussed herein. Haptic element 1160 may be a piezo-electric transducer or other suitable vibration generating device.

In operation, a user can depress key plate 1110, which applies a force on haptic element 1160 and causes key plate 1110 to be mechanically depressed up to a maximum travel that is set by adjustment element 1130. The user experience may vary depending on the type of restoration element used, the travel limit, or other parameters (e.g., flexibility of key plate 1110). Haptic element 1160 may detect when a threshold force is applied (e.g., a piezo-electric element) and instantiate a button press control signal. In some embodiments, haptic element 1160 may further provide a haptic feedback (e.g., a "bump," buzz, or vibration) as a cue that a button press has occurred.

Figure 12A:
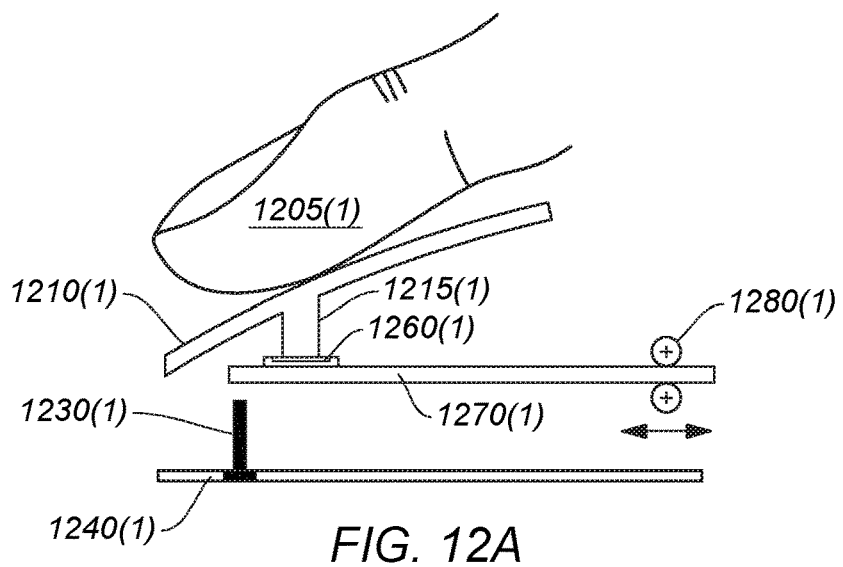
FIG. 12A shows a key plate assembly with haptic feedback and an adjustable key travel and stiffness being operated by a user, according to certain embodiments.

FIG. 12A shows a key plate assembly with haptic feedback and an adjustable key travel and stiffness being operated by a user 1205(1), according to certain embodiments. Key plate 1210(1) is coupled to haptic element 1260(1) (e.g., piezoelectric transducer) via pedestal 1215(1). Haptic element 1260(1) can be coupled to a blade 1270(1) with a stiffness adjustment 1280(1) that can traverse the length of blade 1270(1). As stiffness adjustment 1280(1) moves closer to haptic element 1260(1), the stiffness of blade 1270(1) can increase, resulting in the depression of key plate 1210(1) feeling stiffer. Conversely, as stiffness adjustment 1280(1) moves farther way from haptic element 1260(1), the stiffness of blade 1270(1) can decrease, resulting in the depression of key plate 1210(1) feeling more flexible. An adjustment element 1230(1) configured below blade 1270(1) and coupled to bottom case 1240(1) can be configured to adjust how much key plate 1210(1) can travel in response to user 1205(1) providing a downward force, as shown. Haptic element 1260(1) may detect when a threshold force is applied and instantiate a button press control signal. In some embodiments, haptic element 1260(1) may provide a haptic feedback on key plate 1210(1) as a cue that a button press has occurred. In some embodiments (e.g., according to FIG. 12A), stiffness may be tuned by stiffness adjustment 1280(1), travel distance may be set by adjustment element 1230(1), haptic feedback may be generated by a piezo-based haptic element 1260(1). It should be understood that the locations of the various adjustment elements 1230, 1280 and haptic element may be positioned in a different location or be modified, as would be appreciated by one of ordinary skill in the art, without deviating from the general scope and purview of the four corners of the present document.

Figure 12B:
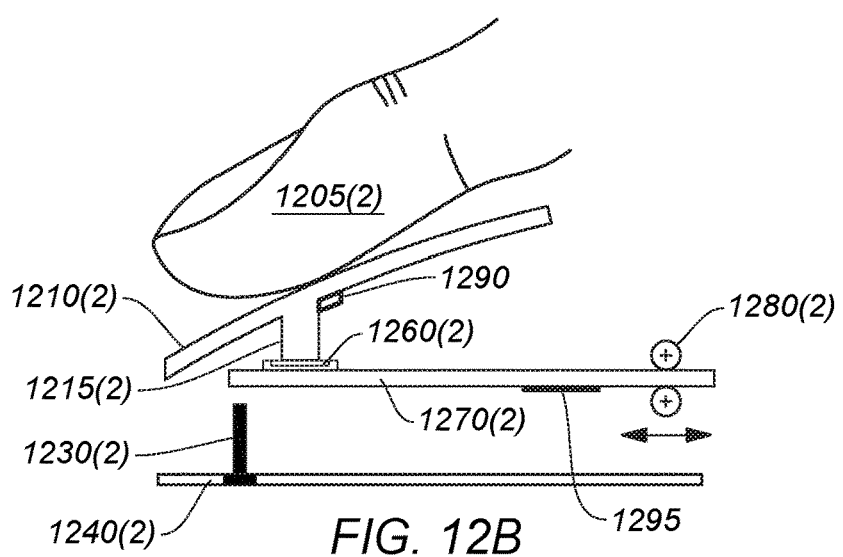
FIG. 12B shows a key plate assembly with haptic feedback and an adjustable key travel and stiffness being operated by a user, according to certain embodiments.

FIG. 12B shows a key plate assembly with haptic feedback and an adjustable key travel and stiffness being operated by a user 1205(2), according to certain embodiments. Key plate 1210(2) includes a pedestal 1215(2) that is coupled to haptic element 1260(2) (e.g., piezoelectric transducer). Haptic element 1260(2) can be coupled to a blade 1270(2) with a stiffness adjustment 1280(2) that can traverse the length of blade 1270(2) and operate as described above with respect to FIG. 12A. As stiffness adjustment 1280(2) moves closer to haptic element 1260(2), the stiffness of blade 1270(2) can increase, resulting in the depression of key plate 1210(2) feeling stiffer. Conversely, as stiffness adjustment 1280(2) moves farther way from haptic element 1260(2), the stiffness of blade 1270(2) can decrease, resulting in the depression of key plate 1210(2) feeling more flexible. An adjustment element 1230(2) configured below blade 1270(2) and coupled to bottom case 1240(2) can be configured to adjust how much key plate 1210(2) can travel in response to user 1205(2) providing a downward force, as shown.

Figure 12C:
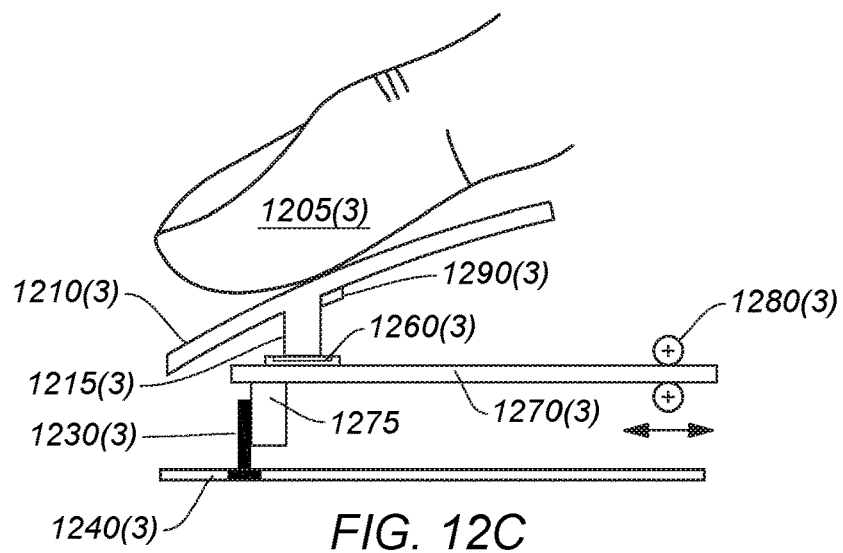
FIG. 12C shows a key plate assembly with haptic feedback and an adjustable key travel and stiffness being operated by a user, according to certain embodiments.

Haptic element 1260(2) may detect when a threshold force is applied and instantiate a button press control signal. In some embodiments, haptic element 1260(2) may further provide a haptic feedback on key plate 1210(2) as a cue that a button press has occurred. Alternatively or additionally, a strain gauge 1295 may be configured to detect an amount of deflection of blade 1270(2) (the "sensing"), which can be used to modulate how much haptic feedback to apply to key plate 1210(2). In some cases, a second haptic element 1290 may be employed to provide a haptic feedback to a user. Haptic element 1290 may be a piezo-electric transducer, a linear resonant actuator (LRA), an eccentric rotating mass (ERM), a voice coil, or other suitable haptic feedback generation device. In some particular embodiments, sensing as shown in FIG. 12B ca be performed by strain gauge 1295 and haptic feedback can be provided a piezo-based element, LRA, ERM, voice coil actuator, or the like FIG. 12C shows a key plate assembly with haptic feedback and an adjustable key travel and stiffness being operated by a user 1205(3), according to certain embodiments. Key plate 1210(3) includes a pedestal 1215(3) that is coupled to haptic element 1260(3) (e.g., piezoelectric transducer). Haptic element 1260(3) can be coupled to a blade 1270(3) with a stiffness adjustment 1280(3) that can traverse the length of blade 1270(3), as described above with respect to FIG. 12A. An adjustment element 1230(3) configured below blade 1270(3) and coupled to bottom case 1240(3) can be configured to adjust how much key plate 1210(3) can travel in response to user 1205(3) providing a downward force, as shown.

Haptic element 1260(3) may detect when a threshold force is applied and instantiate a button press control signal. In some embodiments, haptic element 1260(3) may further provide a haptic feedback on key plate 1210(3) as a cue that a button press has occurred. Alternatively or additionally, an optical detector 1275 can be configured to detect an amount of deflection of blade 1270(2), which can be used to modulate how much haptic feedback to apply to key plate 1210 (2). In some cases, a second haptic element 1290 may be employed to provide a haptic feedback to a user. Haptic element 1290 may be a piezo-electric transducer, a linear resonant actuator (LRA), an eccentric rotating mass (ERM), a voice coil, or other suitable haptic feedback generation device.

In another simplified embodiment, some embodiments may include an input device (e.g., computer mouse) having a housing, one or more processors disposed in the housing, a button coupled to the housing, and a switch coupled to the button and configurable in multiple modes of operation. For instance, in a first mode, the switch can be configured to prevent the button from being mechanically depressible and in a second mode, the input device can be configured to allow the button to be mechanically depressible. The switch may include a mechanical assembly to prevent/allow the button to be depressible. Alternatively or additionally, other methods of preventing/allowing the button to be depressed may be used, including magnetic or electro-magnetic systems, friction-based systems, or the like. In some embodiments, the switch may have a similar effect as moving stiffness adjustment 1280(1) to the shortest possible length such that no deflection of blade 1270(1) is possible. In another embodiment, the switch may be a setting for an adjustment screw (1230(1)) that moves all the way such that the key plate cannot be depressed, as shown in FIG. 12A-12C. Continuing with the present example, a haptic element can be coupled to the button and may be controlled by the one or more processors to generate a haptic feedback. In some cases, a force sensor can be coupled to the button and may be configured to detect when the button receives a pressing force greater than or equal to a predetermined threshold force (e.g., 20-60 gf). The force sensor can be configured to generate a control signal in response to detecting the predetermined threshold force being applied to the button. In some embodiments, the various mechanical adjustments described with respect to FIGS. 11-12C may be software controlled, as would be appreciated by one of ordinary skill in the art with the benefit of this disclosure.

In further embodiments, certain systems and methods can be used to improve electrical characteristics of the piezo actuation driver. For example, utilizing an LC circuit to drive and/or recover energy from a piezo can improve power consumption, especially when driving a piezo element. The LC circuit can be tuned to match a resonant frequency of a piezo element. The piezo element can form a portion of the LC circuit (e.g., the piezo can be modeled, at least in part, as a capacitor). A square wave, quasi square wave or similar signal can be used to drive the piezo element when acting as a haptic output device. For example, inductors of an LC circuit can be alternatively switched to alternatively drive the piezo high or low. The LC circuit could be used to also harness energy from movement of a mouse or areas that a user applies a force to while operating an input device.

In some cases, power efficiency can be improved by matching a frequency response of a key plate to a corresponding actuator (e.g., via a configuration of the key plate structure itself or via a mounting of the key plate), the key plate can be configured to resonate at corresponding or matching frequencies of a piezo-based actuator. Resonant frequencies of a key plate could be adjustable by a user or on an assembly line when manufacturing an input device. The device may be configured to enable a user to adjust a resonant frequency of a key plate. In some cases, the key plate/haptic assembly could be configured/tuned as a unit and then integrated into a larger assembly. In further embodiments, a piezo can be configured to resonate at multiple frequencies depending on different layers/portions being energized. Arranging a physical structure of an assembly may cause vibrations to additively couple/reflect to increase amplitude, as further discussed above.

In certain embodiments, a passive system can be used to detect when a piezo is actuated by a user (e.g., using charge generated from actuating a piezo to charge an LC tank circuit or capacitor and detecting when the charge has met a threshold). In response, an interrupt can be triggered on a coupled IC. In some implementations, integrating a faraday cage or similar structure to shield the piezo and/or driver from stray capacitance may reduce calibration or driving needs.

In some cases, piezo materials can be fragile if too much pressure is applied to them. Some embodiments may include mechanical and/or system solutions configured to redirect high pressure forces (e.g., on a key plate, scroll wheel, etc.) away from the piezo element when the forces exceed a particular threshold.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An input device comprising:
a housing;
a first input structure disposed in the housing, the first input structure having a first resonant frequency and configured to produce an input signal in response to being depressed;
a second input structure disposed in the housing, the second input structure having a second resonant frequency and configured to produce a second input signal in response to being depressed;
a first haptic element coupled to the first input structure, the first haptic element tuned to generate a first haptic feedback at the first resonant frequency and couple the first haptic feedback to the first input structure;
a second haptic element coupled to the second input structure, the second haptic element tuned to generate a second haptic feedback at the second resonant frequency and couple the second haptic feedback to the second input structure; and
a vibration dampening material disposed around the first and second input structure, the vibration dampening material configured to attenuate vibrations caused by the first and second haptic elements that pass from the corresponding first and second input structures to a surrounding portion of the housing,
wherein the first and second input structures are contoured to have their corresponding resonant frequency at their center portion, and contoured to have one or more nodes at an outer edge of their corresponding input structure, such that vibrations at the first and second resonant frequencies on the corresponding input structure are of a lower amplitude at the outer edge than at the center portion.

2. The input device of claim 1 further comprising:
one or more processors disposed in the housing; and
a sensor element controlled by the one or more processors,
wherein the one or more processors apply an active cancellation that cancels signal interference coupled to the sensor element caused by vibrations within a threshold range of the first or second resonant frequency.

3. The input device of claim 2 wherein the first and second haptic elements are piezo-electric transducers controlled by the one or more processors.

4. The input device of claim 1 wherein the first input structure is a button.

5. The input device of claim 4 wherein the first haptic feedback simulates a button press action.

6. The input device of claim 1 wherein the first input structure is a scroll wheel.

7. The input device of claim 6 wherein the first haptic feedback simulates a wheel rotation action.

8. The input device of claim 7 wherein the wheel rotation action includes at least one of a simulated rotational friction, a simulated ratcheted rotation, or a simulated ratchetless rotation.

9. The input device of claim 6 further comprising:
one or more processors configured to:
determine a force characteristic of an input force received on the first input structure;
cause the first haptic element to generate a first type of haptic feedback in response to a determination that the force characteristic is of a first type; and
cause the first haptic element to generate a second type of haptic feedback in response to determining that the force characteristic is of a second type.

10. The input device of claim 9 wherein the first type of haptic feedback simulates a button press action, and
wherein the second type of haptic feedback simulates a wheel rotation action.

11. The input device of claim 10 wherein the wheel rotation action includes at least one of a simulated rotational friction, a simulated ratcheted rotation, or a simulated ratchetless rotation.

12. A computer peripheral device comprising:
a first input structure having a first resonant frequency and configured to produce an input signal in response to being depressed;
a second input structure having a second resonant frequency and configured to produce a second input signal in response to being depressed;
a first haptic element coupled to the first input structure, the first haptic element tuned to generate a first haptic feedback at the first resonant frequency and couple the first haptic feedback to the first input structure; and
a second haptic element coupled to the second input structure, the second haptic element tuned to generate a second haptic feedback at the second resonant frequency and couple the second haptic feedback to the second input structure,
wherein the first and second input structures are contoured to have their corresponding resonant frequency at their center portion, and contoured to have one or more nodes at an outer edge of their corresponding input structure, such that vibrations at the first and second resonant frequencies on the corresponding input structure are of a lower amplitude at the outer edge than at the center portion.

13. The computer peripheral device of claim 12 further comprising:
one or more processors; and
a sensor element controlled by the one or more processors,
wherein the one or more processors apply an active cancellation that cancels signal interference coupled to the sensor element caused by vibrations within a threshold range of the first or second resonant frequency.

14. The input device of claim 12 wherein the first input structure is a button.

15. The input device of claim 12 wherein the first input structure is a scroll wheel.

16. The input device of claim 15 wherein the first haptic feedback simulates a wheel rotation action.

17. The input device of claim 16 wherein the wheel rotation action includes at least one of a simulated rotational friction, a simulated ratcheted rotation, or a simulated ratchetless rotation.

18. The input device of claim 15 further comprising:
one or more processors configured to:
determine a force characteristic of an input force received on the first input structure;
cause the first haptic element to generate a first type of haptic feedback in response to a determination that the force characteristic is of a first type; and cause the first haptic element to generate a second type of haptic feedback in response to determining that the force characteristic is of a second type.

19. The input device of claim 18 wherein the first type of haptic feedback simulates a button press action, and wherein the second type of haptic feedback simulates a wheel rotation action.

20. The input device of claim 19 wherein the wheel rotation action includes at least one of a simulated rotational friction, a simulated ratcheted rotation, or a simulated ratchetless rotation.

\* \* \* \* \*